US009343718B2

(12) United States Patent
Kim

(10) Patent No.: US 9,343,718 B2
(45) Date of Patent: May 17, 2016

(54) RECHARGEABLE BATTERY

(71) Applicant: Samsung SDI Co., Ltd., Yongin-si, Gyeonggi-do (KR)

(72) Inventor: Dae-Kyu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 293 days.

(21) Appl. No.: 13/897,230

(22) Filed: May 17, 2013

(65) Prior Publication Data
US 2014/0045052 A1 Feb. 13, 2014

Related U.S. Application Data

(60) Provisional application No. 61/681,045, filed on Aug. 8, 2012.

(51) Int. Cl.
*H01M 2/14* (2006.01)
*H01M 10/04* (2006.01)

(52) U.S. Cl.
CPC ............... *H01M 2/14* (2013.01); *H01M 2/145* (2013.01); *H01M 10/0422* (2013.01); *H01M 10/0431* (2013.01); *H01M 10/0468* (2013.01); *Y10T 29/4911* (2015.01)

(58) Field of Classification Search
CPC ..................................................... H01M 2/14
USPC ........................................................ 429/186
See application file for complete search history.

(56) References Cited

U.S. PATENT DOCUMENTS

| 5,047,068 A | 9/1991 | Stoklosa et al. |
| 2003/0198863 A1* | 10/2003 | Murashige et al. ............. 429/53 |
| 2007/0154801 A1* | 7/2007 | Hyung et al. ................. 429/180 |
| 2011/0117403 A1* | 5/2011 | Hermann et al. ............... 429/94 |

FOREIGN PATENT DOCUMENTS

| JP | 08-250155 | 9/1996 |
| JP | 11-224689 A | 8/1999 |
| KR | 10-2009-0116450 A | 11/2009 |
| KR | 10-2010-0092700 A | 8/2010 |

OTHER PUBLICATIONS

Machine English Translation of JP08-250155, Patent Abstracts of Japan, 6 pages.
English Machine Translation of Japanese Patent Publication No. 11-224689 A, dated Aug. 17, 1999, 11 pages.
European Search Report for Patent Application No. 13171942.9, dated Jan. 2, 2014, 4 pages.

* cited by examiner

*Primary Examiner* — James Lee
(74) *Attorney, Agent, or Firm* — Lewis Roca Rothgerber Christie LLP

(57) ABSTRACT

A battery includes an electrode assembly including a positive electrode, a negative electrode, and a separator between the positive electrode and the negative electrode, an elastic member at an interior of the electrode assembly and being configured to exert an elastic force on the electrode assembly, a polymer member between the elastic member and the electrode assembly, and a case for housing the electrode assembly, the elastic member, and the polymer member.

15 Claims, 16 Drawing Sheets

RECHARGEABLE BATTERY

CROSS-REFERENCE TO RELATED APPLICATION

This application claims priority to and the benefit of U.S. Provisional Application No. 61/681,045, filed on Aug. 8, 2012, in the U.S. Patent and Trademark Office, the entire content of which is incorporated herein by reference.

BACKGROUND (a) Field

Embodiments of the present invention relate to a rechargeable battery.

(b) Description of the Related Art

A rechargeable battery is a battery that is intended to be repeatedly charged and discharged, unlike a primary battery. A small-sized rechargeable battery may be used as a power supply for small electronic devices such as cellular phones, notebook computers, and cameras, while a medium-sized or large-sized rechargeable battery is used as a power supply for driving motors in hybrid vehicles and the like. The rechargeable battery may be used in small electronic devices as a single-cell battery, or may be used in motor-driving power sources, etc. as a battery module wherein a plurality of cells are electrically coupled. The rechargeable battery module is formed by coupling electrode terminals through a bus bar. An electrode assembly including a positive electrode and a negative electrode is provided in the rechargeable battery, and stable support of the shape of the electrode assembly may be sought. When the electrode assembly is deformed, an unstable reaction may occur in the rechargeable battery, and thus, an output (e.g., power output, or power efficiency) may be deteriorated, or the rechargeable battery may explode. Particularly, when a center pin in the electrode assembly is deformed due to excessive temperature, the electrode assembly is deformed, thereby deteriorating performance of the rechargeable battery.

The above information disclosed in this Background section is only for enhancement of understanding of the background of embodiments of the invention, and may therefore contain information that does not form the prior art that is already known in this country to a person of ordinary skill in the art.

SUMMARY

Embodiments of the present invention provide a rechargeable battery that can avoid or prevent deformation of an electrode assembly. A battery according to an exemplary embodiment of the present invention includes an electrode assembly including a positive electrode, a negative electrode, and a separator between the positive electrode and the negative electrode, an elastic member at an interior of the electrode assembly and being configured to exert an elastic force on the electrode assembly, a polymer member between the elastic member and the electrode assembly, and a case for housing the electrode assembly, the elastic member, and the polymer member.

The polymer member may include an adhesive interior surface or an adhesive exterior surface.

A length of the elastic member may be substantially equal to a length of the electrode assembly.

The polymer member may include polysterene, oriented polysterene, or a material that is at least partially dissolvable by electrolyte solution of the electrode assembly.

The polymer member may include polyethylene, polypropylene, ethylene propylene diene monomer (EPDM), or a material that is non-reactive with electrolyte solution.

The polymer member may be discontinuous along a periphery of the polymer member.

The battery may further include an expandable support member partially surrounding the polymer member.

The support member may include an elastic band.

A battery core according to another exemplary embodiment of the present invention includes an elastic member, and a polymer member at least partially surrounding the elastic member and compressing the elastic member, wherein the polymer member is configured to at least partially dissolve in an electrolyte solution to release compression of the elastic member.

The polymer member may include polysterene or oriented polysterene.

The polymer member may have a notch along a lateral side of the polymer member.

The polymer member may include a material configured to dissolve in the electrolyte solution along a lateral side of the polymer member, and at least one of polyethylene, polypropylene, ethylene propylene diene monomer (EPDM), or a material that is non-reactive with the electrolyte solution.

The battery core may further include an expandable support member partially surrounding the polymer member.

The support member may include an elastic band.

The polymer member may include an injection-molded pipe.

A method of assembling a battery according to another embodiment of the present invention includes inserting a core into an electrode assembly located in a case, and sealing a cap assembly to the case, wherein the core includes an elastic member and a polymer member for maintaining a compressed state of the elastic member.

The method may further include forming the polymer member by injection molding.

The method may further include compressing the elastic member by bending the elastic member such that lateral side ends of the elastic member approach each other, contact, or overlap.

The polymer member may be at least partially dissolved in an electrolyte solution of the battery.

DETAILED DESCRIPTION

Figure 1:
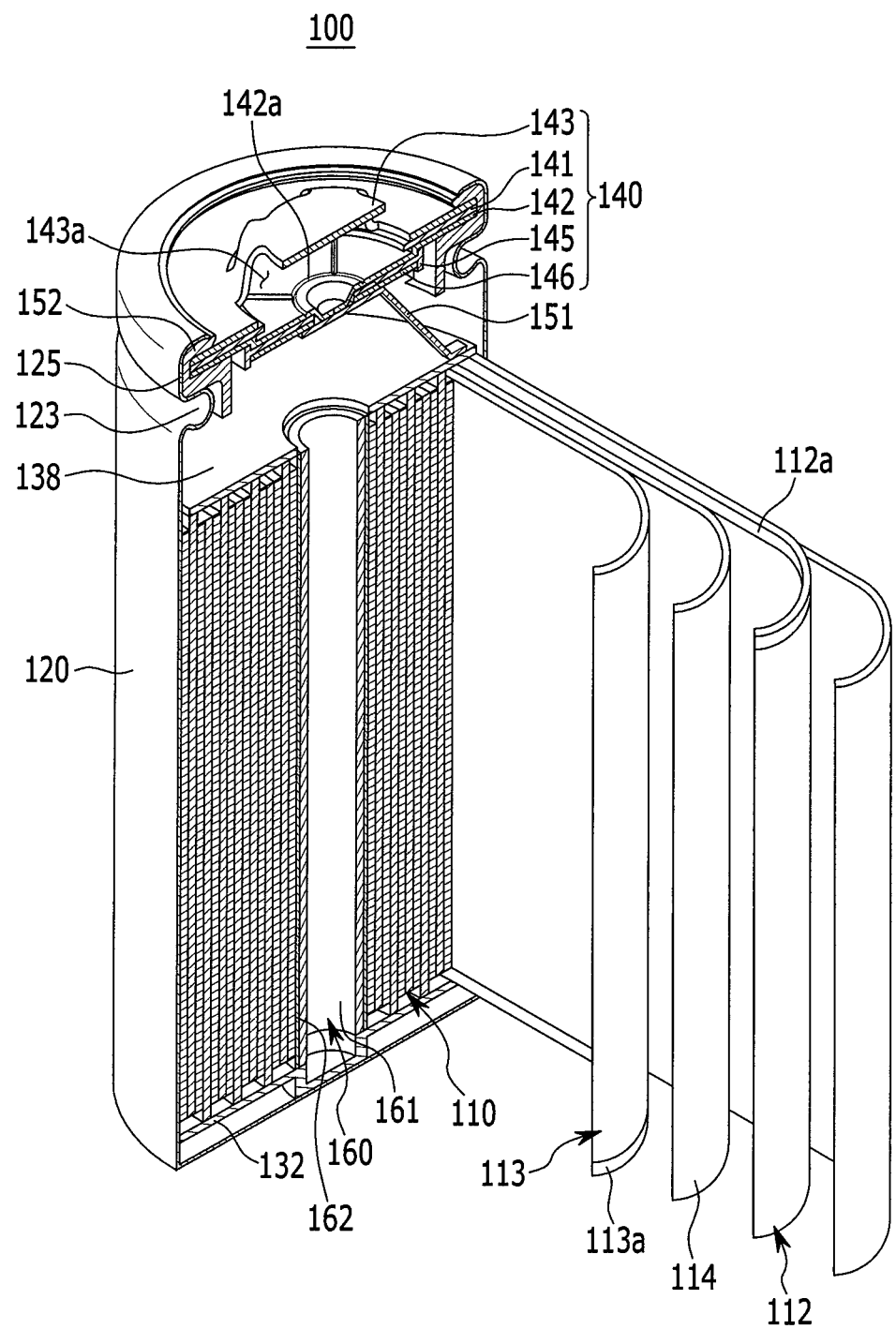
FIG. 1 is a cut-out perspective view of a rechargeable battery according to an embodiment of the present invention.

Embodiments of the present invention will be described more fully hereinafter with reference to the accompanying drawings, in which exemplary embodiments of the invention are shown. As those skilled in the art would realize, the described embodiments may be modified in various ways, all without departing from the spirit or scope of the present invention. The drawings and description are to be regarded as illustrative in nature and not restrictive. Like reference numerals designate like elements throughout the specification.

Figure 2:
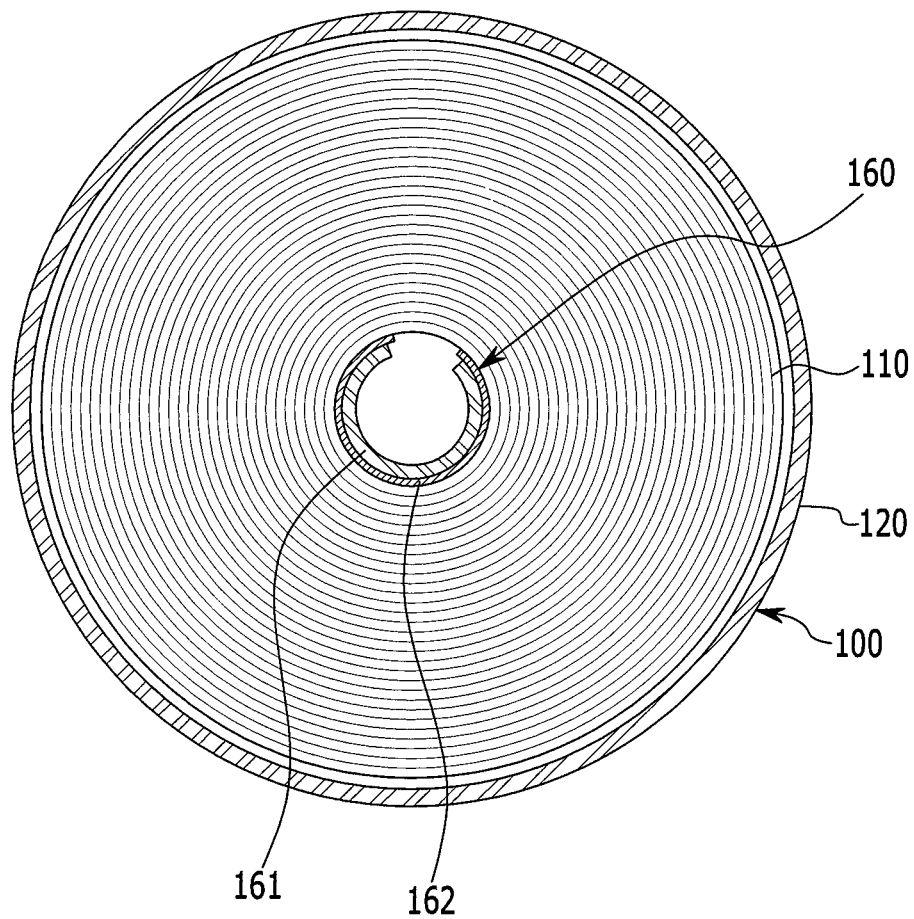
FIG. 2 is a cross-sectional view of a rechargeable battery according to a first exemplary embodiment of the present invention.

FIG. 1 is a cut-out perspective view of a rechargeable battery according to an embodiment of the present invention, and FIG. 2 is a cross-sectional view of a rechargeable battery according to a first exemplary embodiment of the present invention.

Referring to FIGS. 1 and 2, a rechargeable battery 100 according to the present exemplary embodiment includes an electrode assembly 110 having a positive electrode 112, a negative electrode 113, and a separator 114 therebetween, and a case 120 having an opening at one end to receive the electrode assembly 100 and an electrolyte solution.

In addition, a cap assembly 140 is provided with a gasket 152 to seal the case 120. The case 120 may be formed of a conductive metal such as, for example, aluminum, an aluminum alloy, or nickel-plated steel. The case 120 according to the present exemplary embodiment is formed in the shape of a cylinder having an inner space where the electrode assembly 110 is located. The cap assembly 140 is fit to the case 120 and fixed to the case 120 by clamping, and during this process, a beading portion 123 and a clamping portion 125 are formed in the case 120.

Although the electrode assembly 110 according to the exemplary embodiment is cylindrical, in which the positive electrode 112, the separator 114, and the negative electrode 113 are stacked and wound in a spiral shape, the structure of the electrode assembly 110 is not limited thereto, and the electrode assembly 110 may have other structures such as, for example, a prismatic shape, etc.

A space is present at the center of the electrode assembly 110, and a core 160 is provided in the space for maintaining the cylindrical shape of the electrode assembly 110.

In addition, a positive electrode uncoated region 112a, where no positive active material is coated, is formed at an upper end of the positive electrode 112, such that the positive electrode uncoated region 112a is electrically coupled with a positive electrode current collecting plate 138. Further, a negative electrode uncoated region 113a, where no negative active material is coated, is formed at a lower end of the negative electrode 113, such that the negative electrode uncoated region 113a is electrically coupled with a negative electrode current collecting plate 132.

In the present exemplary embodiment, the positive electrode current collecting plate 138 is installed at an upper portion of the electrode assembly 110, and the negative electrode current collecting plate 132 is installed at a lower portion of the electrode assembly 110. However, the present invention is not limited thereto, and the positive electrode current collecting plate 138 may be installed at the lower portion of the electrode assembly 110, and the negative electrode current collecting plate 132 may be installed at the upper portion of the electrode assembly 110.

The cap assembly 140 includes a cap plate 143 where an exhaust hole 143a is formed, and a vent plate 142, which is configured to discharge gas when broken by sufficient pressure internal to the case 120 (e.g., at a predetermined pressure condition), is provided below the cap plate 143. Upon breaking, the vent plate 142 disconnects an electric connection between the electrode assembly 110 and the cap plate 143.

A positive temperature coefficient element 141 is provided between the cap plate 143 and the vent plate 142, which is a device having nearly infinite electrical resistance (e.g., an open circuit) when its temperature becomes sufficiently high (e.g., when a temperature exceeds a predetermined temperature), and when the temperature of the rechargeable battery 100 is high enough (e.g., exceeds a predetermined temperature), the positive temperature coefficient element 141 blocks flow of a charging current and flow of a discharging current.

The vent plate 142 protrudes downward, and a sub-plate 147 is attached to a bottom side of the protruded portion of the vent plate 142.

A middle plate 146, which is electrically coupled with the electrode assembly 110 through a lead portion 151, is formed at an edge of the vent plate 142, and an insulator 145 is provided between the middle plate 146 and the vent plate 142 for insulation between the middle plate 146 and the vent plate 142.

As shown in FIG. 2, the core 160 can be inserted to the center of the electrode assembly 110 to support the shape of the electrode assembly 110.

Figure 3:
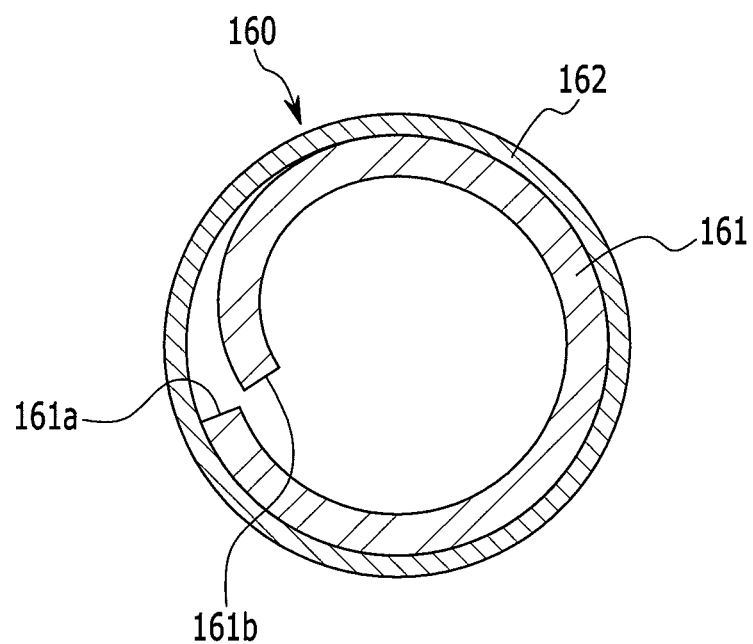
FIG. 3 is a perspective view of a core according to the first exemplary embodiment of the present invention.
Figure 4:
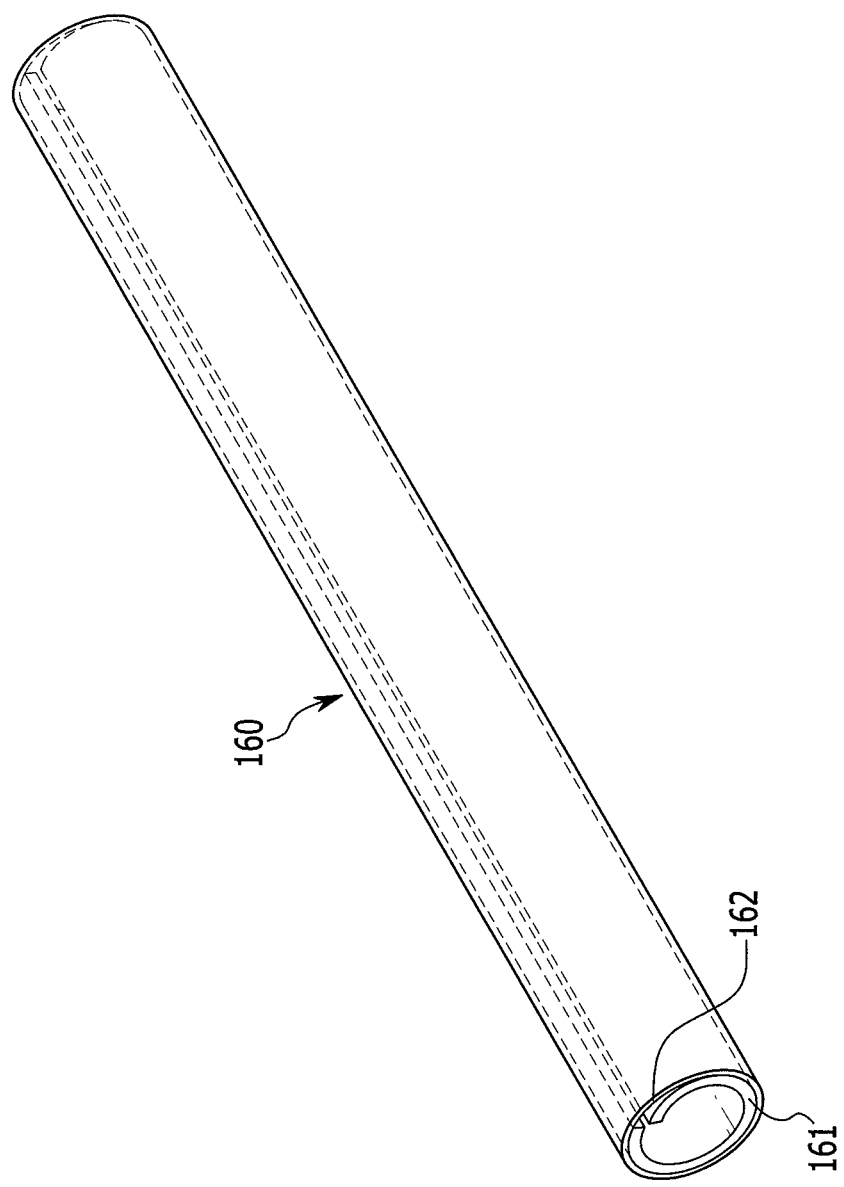
FIG. 4 is a cross-sectional view of the core according to the first exemplary embodiment of the present invention.
Figure 5:
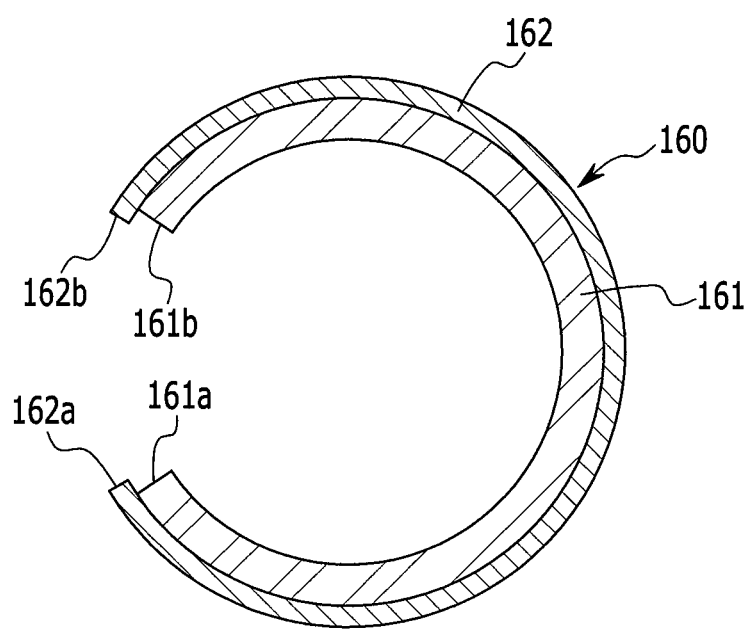
FIG. 5 is a cross-sectional view of the core according to the first exemplary embodiment of the present invention shown in an open state.

FIG. 3 is a perspective view of the core according to the first exemplary embodiment of the present invention, FIG. 4 is a cross-sectional view of the core according to the first exemplary embodiment shown in FIG. 3, and FIG. 5 is a cross-sectional view of the core of the first exemplary embodiment shown in the open state.

Referring to FIG. 3 to FIG. 5, the core 160 is formed in the shape of a cylindrical hollow pipe. The core 160 includes an elastic member (e.g., a spring member) 161 having a cutout portion, and a polymer member 162 surrounding the elastic member 161.

The elastic member 161 is formed in the shape of a pipe having an inner space, and having a cutout portion extending in a length direction of the elastic member 161. Accordingly, the elastic member 161 includes a first side end 161a formed at one open-ended edge of the peripheral surface that extends in the length direction of the elastic member 161, and extending the length direction of the elastic member 161, and a second side end 161b separated from the first side end 161a and extended in the length direction of the elastic member 161.

The polymer member 162 is formed to surround the elastic member 161, and is formed of a polymer material configured to dissolve in the electrolyte solution. The polymer member 162 according to the present exemplary embodiment is formed as a tape having adhesive interior and exterior surfaces, and accordingly, the interior surface of the polymer member 162 is attached to the elastic member 161 and the exterior surface of the polymer member 162 is attached to the electrode assembly 110.

The polymer member 162 may be formed of a material including, for example, polysterene, and may be formed of oriented polystyrene (OPS).

As shown in FIG. 4, the core 160 is inserted into the electrode assembly 110 while the elastic member 161 is surrounded by the polymer member 162, and is pressed by the polymer member 162, and is thus in a compressed state.

For this, the polymer member 162 surrounds the elastic member 161, and has a larger curvature (e.g., a smaller radius of curvature) than the polymer member 162.

As shown in FIG. 5, when the core 160 is inserted into the rechargeable battery 100, and thus contacts the electrolyte solution (e.g., for a predetermined time period), the polymer member 162 may be partially dissolved by the electrolyte solution such that strength, or structural integrity, of the polymer member 162 is decreased. When the strength of the polymer member 162 becomes weaker than an elastic force of the elastic member 161, the polymer member 162 is torn, and the elastic member 161 is no longer compressed by the polymer member 162.

In this case, a gap is formed in the polymer member 162, and a first open-ended edge of the peripheral surface that extends in the length direction of the polymer member 162 (e.g., first side end 162a) and a second open-ended edge of the peripheral surface that extends in the length direction of the polymer member 162 (e.g., a second side end) 162b separated from the first side end 162a are formed in the external periphery (e.g., formed by the tearing of the polymer member 162).

The properties of the elastic member 161 cause the gap between the first side end 161a and the second side end 161b to increase following the breakage of the polymer member 162, and the elastic member 161 expands to have a smaller curvature (e.g., a larger radius of curvature) than when initially inserted, and thus presses the electrode assembly 110 (e.g., toward an interior surface of the case 120).

In the case of a conventional core, the strength of the core is weakened as the internal temperature of the rechargeable battery is increased, and is thereby deformed. However, according to the first exemplary embodiment, the deformation of the core 160 can be avoided or prevented because the core 160 includes the elastic member 161, and the circular core 160 is compressed and inserted, and the compression force is thereafter released, allowing the electrode assembly 110 to be further stably supported. In addition, since the polymer member 162 is attached to the elastic member 161 and the electrode assembly 110, the polymer member 162 can support the elastic member 161.

Figure 6:
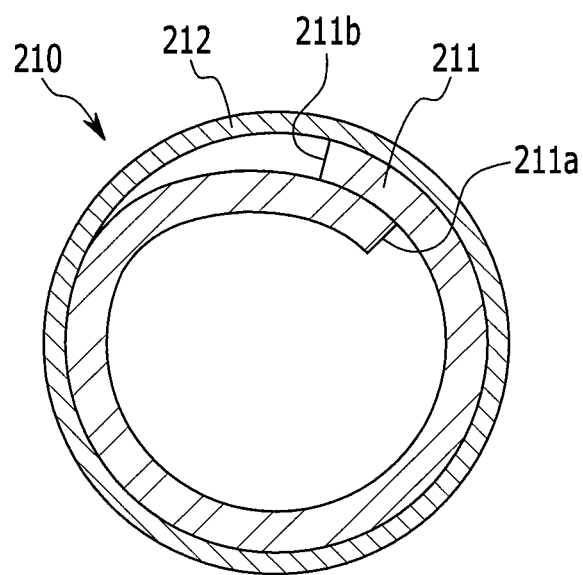
FIG. 6 is a cross-sectional view of a core according to a second exemplary embodiment of the present invention.
Figure 7:
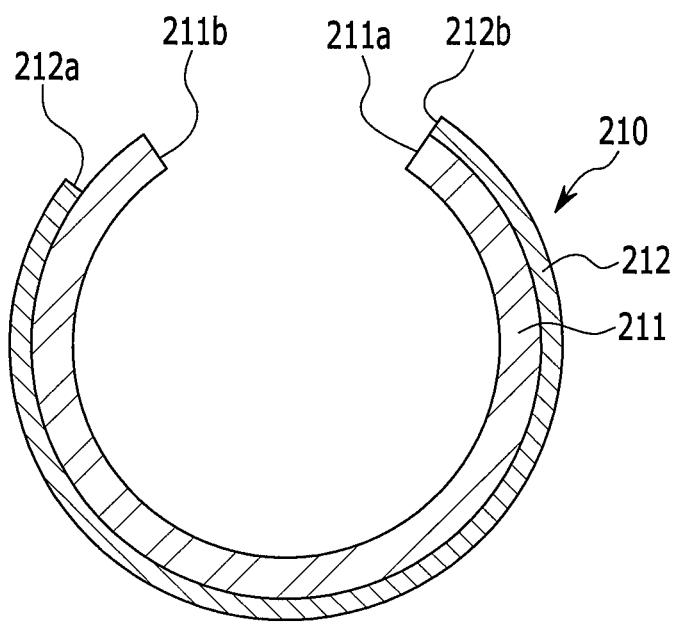
FIG. 7 is a cross-sectional view of the core according to the second exemplary embodiment of the present invention shown in an open state.

FIG. 6 is a cross-sectional view of a core according to a second exemplary embodiment of the present invention, and FIG. 7 is a cross-sectional view of the core of the second exemplary embodiment shown in an open state.

Referring to FIG. 6 and FIG. 7, a core 210 is formed in the shape of a hollow cylindrical pipe. The core 210 includes an elastic member (e.g., a spring member) 211 having a cutout portion, and a polymer member 212 surrounding the elastic member 211.

The elastic member 211 is formed in the shape of a pipe having an inner space, and includes a first side end 211a formed at one open-ended edge of the peripheral surface that extends in the length direction of the elastic member 211 (e.g., along a break in one surface of the discontinuous pipe shape), and a second side end 211b separated from the first side end 211a and extended in the length direction of the elastic member 211.

The polymer member 212 is formed to surround the elastic member 211, and is formed of a polymer material dissolved in the electrolyte solution. The polymer member 212 according to the present exemplary embodiment is formed in the shape of an injection-molded pipe, and may be formed of a material including polysterene.

As shown in FIG. 6, the core 210 is initially inserted in the electrode assembly 110 while the elastic member 211 is surrounded by the polymer member 212, and is therefore pressed by the polymer member 212, and is thus in a compressed state.

For this, the polymer member 212 surrounds the elastic member 211, and the elastic member 211 is bent with a larger curvature than the polymer member 212. Here, deformation, or compression, of the elastic member 211 occurs, and the elastic member 211 is bent such that lateral side ends 211a and 211b are overlapped.

As shown in FIG. 7, when the core 210 is inserted to the rechargeable battery and contacts an electrolyte solution (e.g., for a predetermined time period), the polymer member 212 may be partially dissolved by the electrolyte solution, and thus the strength thereof becomes weakened. When the strength of the polymer member 212 becomes weaker than an elastic force of the elastic member 211, the polymer member 212 is torn, and the elastic member 211 is no longer compressed by the polymer member 212. Accordingly, a gap is formed in the polymer member 212, and a first open-ended edge 212a of the peripheral surface that extends in the length direction of the polymer member 212, as well as a second open-ended edge 212b of the peripheral surface that extends in the length direction of the polymer member 212 separated from the first open-ended edge 212a, are formed in the periphery along a length of the polymer member 212.

The physical characteristics of the elastic member 212 are such that the gap between the first side end 211a and the second side end 211b is increased upon the breakage of the polymer member 212, and the elastic member 211 spreads or expands to have a smaller curvature than when initially inserted, and thus presses the electrode assembly 110.

Figure 8:
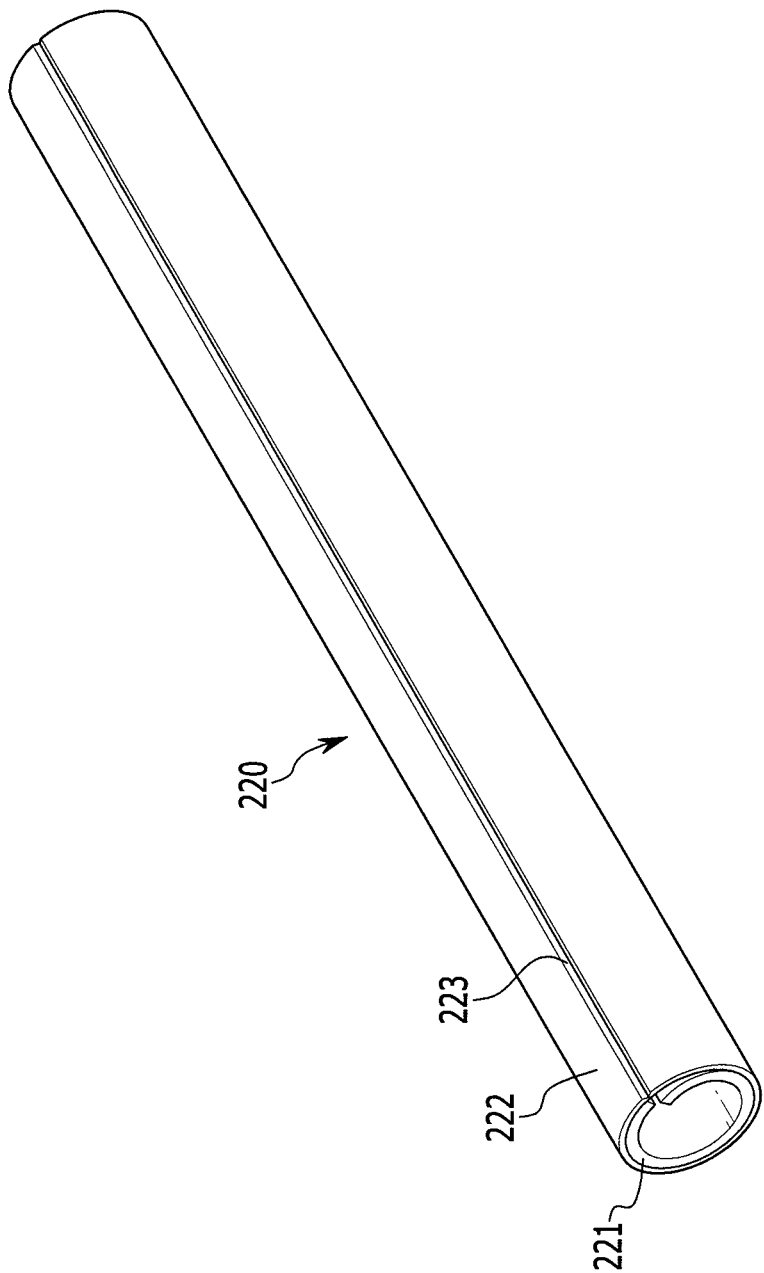
FIG. 8 is a perspective view of a core according to a third exemplary embodiment of the present invention.
Figure 9:
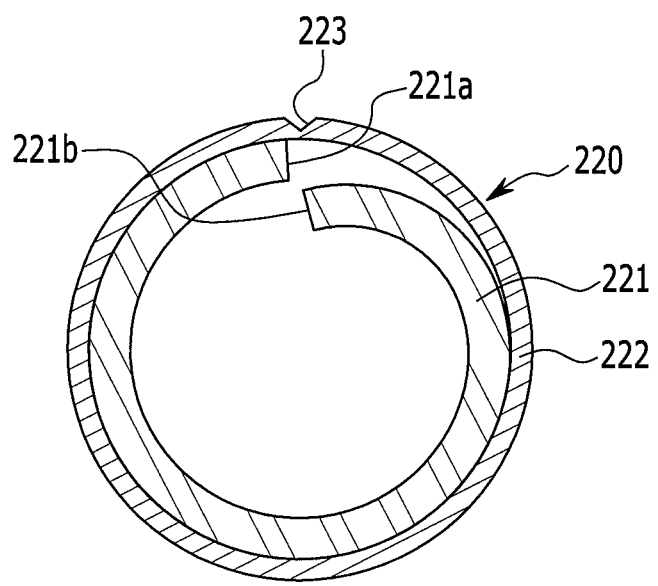
FIG. 9 is a cross-sectional view of the core according to the third exemplary embodiment of the present invention.
Figure 10:
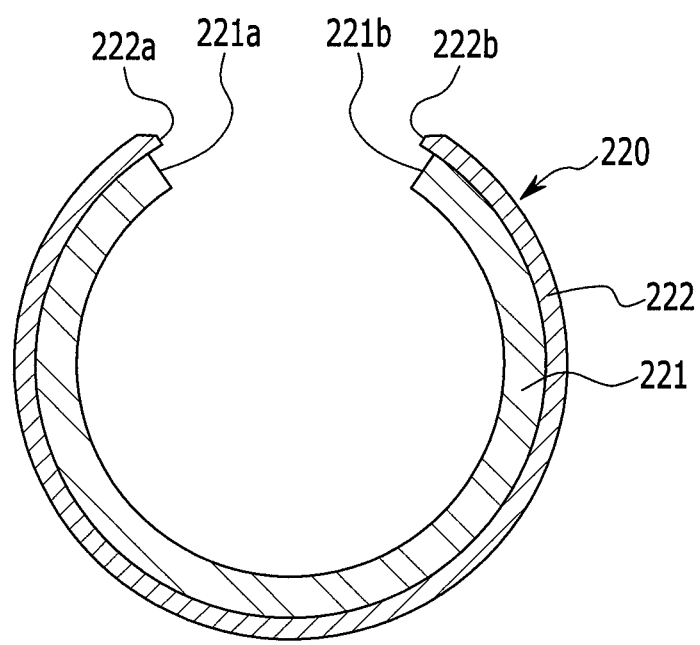
FIG. 10 is a cross-sectional view of the core according to the third exemplary embodiment of the present invention shown in an open state.

FIG. 8 is a perspective view of a core according to a third exemplary embodiment of the present invention, FIG. 9 is a cross-sectional view of the core according to the third exemplary embodiment of the present invention, and FIG. 10 is the core according to the third exemplary embodiment shown in an open state.

Referring to FIG. 8 to FIG. 10, a core 220 is formed in the shape of a cylindrical hollow pipe. The core 220 includes an elastic member (e.g., a spring member) 221 having a cutout portion, and a polymer member 222 surrounding the elastic member 221. The elastic member 221 is formed in the shape of a pipe having an inner space.

The elastic member 221 includes a first side end 221a formed as an open-ended edge of the peripheral surface that extends in the length direction of the elastic member 221 (e.g., along a break in one surface of the pipe), and a second side end 221b separated from the first side end 221a and extended in the length direction of the elastic member 221. The first side end 221a and the second side end 221b are separated, thus forming a cutout portion.

The polymer member 222 surrounds the elastic member 221, and is formed in the shape of an injection-molded circular pipe. A notch 223 extending in a length direction of the polymer member 222 is formed in, or along, the periphery of the polymer member 222 in a length direction.

As shown in FIG. 9, the core 220 is initially inserted in the electrode assembly 110 while the elastic member 221 is surrounded by the polymer member 222, and is therefore pressed by the polymer member 222, and is thus in a compressed state. For this, the polymer member 222 surrounds the elastic member 221, and the elastic member 221 is bent with a larger curvature than the polymer member 222.

As shown in FIG. 10, when the core 220 is inserted in the rechargeable battery and contacts an electrolyte solution (e.g., contacts the electrolyte solution for a predetermined time period), the polymer member 222 may be partially dissolved by the electrolyte solution, and thus the strength and integrity of the polymer member 222 is weakened. When the strength of the polymer member 222 becomes weaker than an elastic force of the elastic member 221, the polymer member 222 is torn, and thus the elastic member 221 expands.

Accordingly, a gap is formed in the polymer member 222, and a first open-ended edge 222a of the peripheral surface that extends in the length direction of the polymer member 222, and a second external open-ended edge 222b separated from the first open-ended edge 222a, are formed in the periphery of the polymer member 222.

The characteristics of the elastic member 222 are such that the gap between the first side end 221a and the second side end 221b is increased upon the breakage of the polymer member 222, allowing the elastic member 221 to spread to have a smaller curvature than when being initially inserted, and thus presses the electrode assembly 110.

Here, the polymer member 222 is formed of a polymer material (e.g., a polymer material having a predetermined thickness) forming the notch, and accordingly, the polymer member 222 can support the shape of the elastic member 221. The polymer member 222 has elasticity such that the polymer member 222 can avoid or prevent expansion of the elastic member 221 to transmit an elastic force to the electrode assembly 110.

Figure 11:
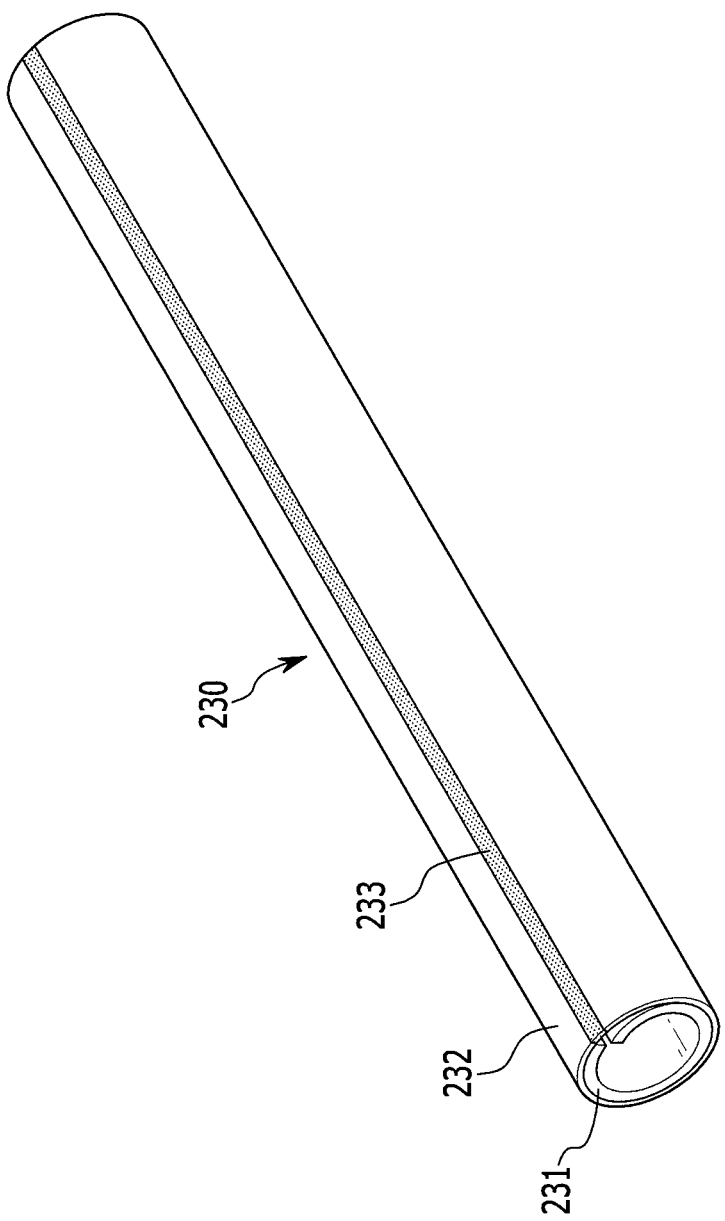
FIG. 11 is a perspective view of a core according to a fourth exemplary embodiment of the present invention.
Figure 12:
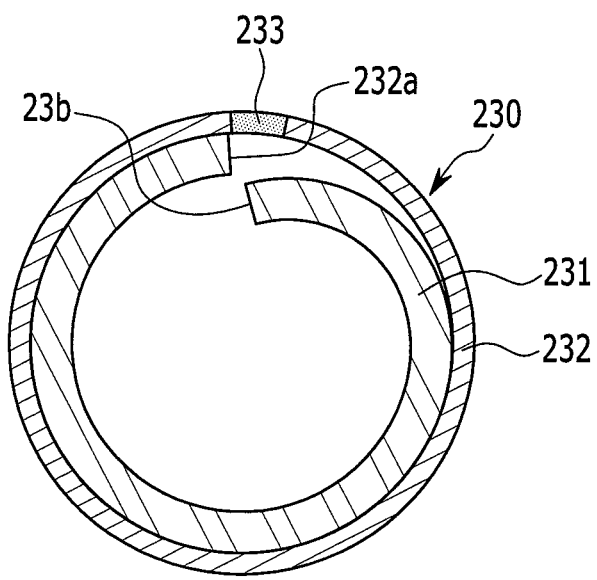
FIG. 12 is a cross-sectional view of the core according to the fourth exemplary embodiment of the present invention.
Figure 13:
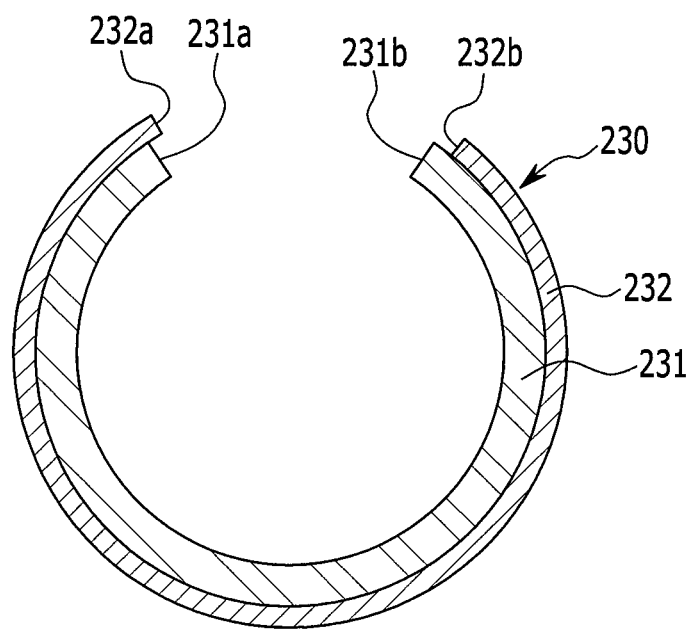
FIG. 13 is a cross-sectional view of the core according to the fourth exemplary embodiment of the present invention shown in an open state.

FIG. 11 is a perspective view of a core according to a fourth exemplary embodiment of the present invention, FIG. 12 is a cross-sectional view of the core according to the fourth exemplary embodiment, and FIG. 13 is a cross-sectional view of the core according to the fourth exemplary embodiment shown in an open state.

Referring to FIG. 11 to FIG. 13, a core 230 is formed in the shape of a cylindrical hollow pipe. The core 230 includes an elastic member (e.g., a spring member) 231 having a cutout portion, and a polymer member 232 surrounding the elastic member 231. The elastic member 231 is formed in the shape of a pipe having an inner space, and includes a first side end 231a formed as an open-ended edge of the peripheral surface that extends in the length direction of the elastic member 231 (e.g., along a break in one surface of the pipe), and a second side end 231b separated from the first side end 231a and extended in the length direction of the elastic member 231. The first side end 231a and the second side end 231b are separated to form a cutout portion.

The polymer member 232 is formed to surround the elastic member 231, and is formed in the shape of an injection-molded circular pipe. A dissolving unit 223 extending in a length direction of the polymer member 232 is formed in the surface of, and extending a length of, the polymer member 232.

The polymer member 232 is formed of elastic polymer, and may be formed of a material that does not react with the electrolyte solution, such as polyethylene, polypropylene, EPDM, and the like. In addition, the dissolving unit 223 is extended to a length direction of the polymer member 232 and bonded to both ends of the polymer member 232, and may be formed of polystyrene, which may be easily dissolved to the electrolyte solution.

As shown in FIG. 12, the core 230 is initially inserted in the electrode assembly 110 while the elastic member 231 is surrounded by the polymer member 232. In this case, the elastic member 231 is pressed by the polymer member 232 to be in a compressed state. For this, the polymer member 232 surrounds the elastic member 231, and the elastic member 231 is bent with a larger curvature than the polymer member 232.

As shown in FIG. 13, when the core 230 is inserted in the case 120 of the rechargeable battery and contacts an electrolyte solution (e.g., for a predetermined time period), the dissolving unit 233 may be dissolved by the electrolyte solution to form a gap in the polymer member 232. Accordingly, a first open-ended edge 232a of the peripheral surface that extends in the length direction of the polymer member 232 and a second open-ended edge 232b separated from the first open-ended edge 232a are formed in along a length of the external periphery of the polymer member 232.

The characteristics of the elastic member 232 are such that the gap between the first side end 231a and the second side end 231b increases after the breakage of the polymer member 232, as the elastic member 231 spreads, or expands, to have a smaller curvature than when initially inserted, thereby pressing the electrode assembly 110.

Since the polymer member 232 is formed of an elastic polymer material, the polymer member 232 has a degree of strength, and thus the polymer member 232 can support the shape of the elastic member 231.

Further, the polymer member 232 has elasticity such that the polymer member 232 can avoid or prevent expansion of the elastic member 231 to transmit an elastic force to the electrode assembly 110.

Figure 14:
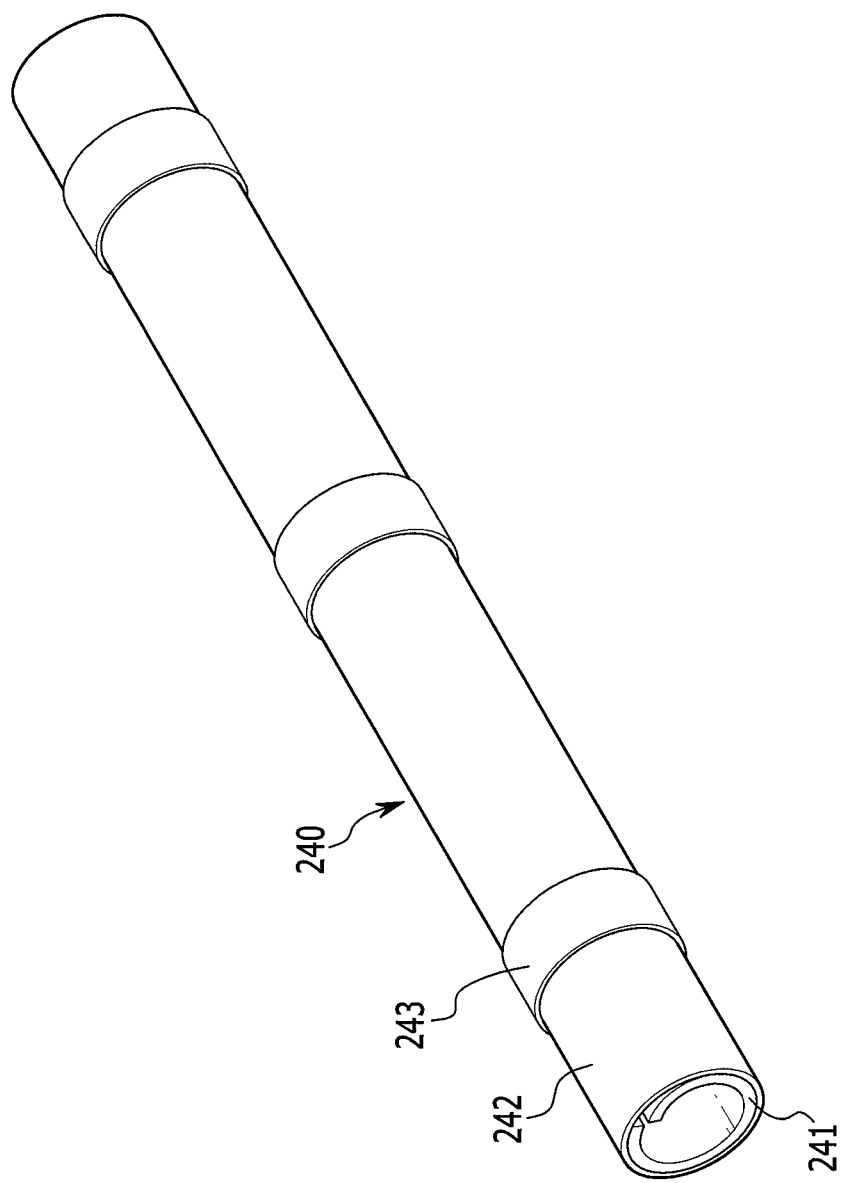
FIG. 14 is a perspective view of a core according to a fifth exemplary embodiment of the present invention.
Figure 15:
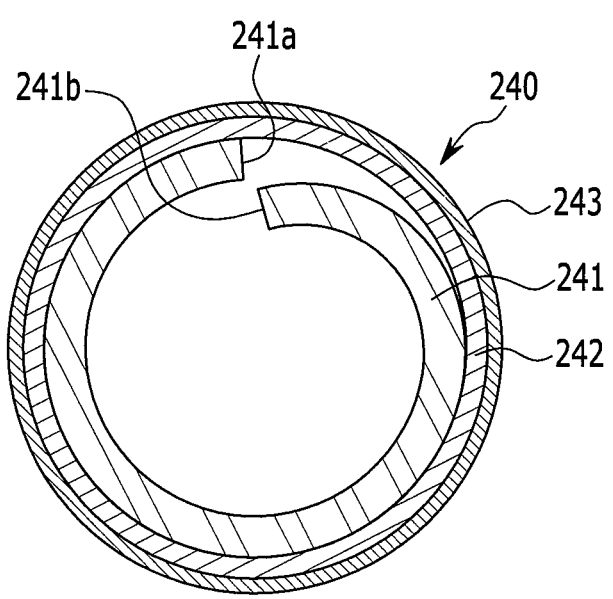
FIG. 15 is a cross-sectional view of the core according to the fifth exemplary embodiment of the present invention.
Figure 16:
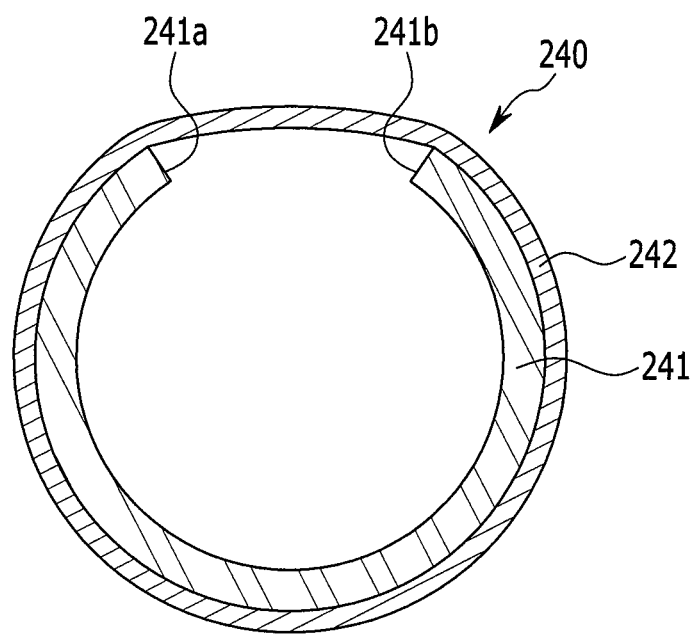
FIG. 16 is a cross-sectional view of the core according to the fifth exemplary embodiment of the present invention shown in an open state.

FIG. 14 is a perspective view of a core according to a fifth exemplary embodiment of the present invention, FIG. 15 is a cross-sectional view of the core according to the fifth exemplary embodiment, and FIG. 16 is a cross-sectional view of the core according to the fifth exemplary embodiment shown in an open state.

Referring to FIG. 14 to FIG. 16, a core 240 is formed in the shape of a cylindrical hollow pipe, and includes an elastic member (e.g., a spring member) 241, a polymer member 242 surrounding the elastic member 241, and one or more band-shaped support members 243 surrounding the polymer member 242.

The elastic member 241 is formed in the shape of a pipe having an inner space, and includes a first side end 241a formed as an open-ended edge of the peripheral surface that extends in the length direction of the elastic member 241, and a second side end 241b separated from the first side end 241a and extended in the length direction of the elastic member 241. The first side end 221a and the second side end 221b are separated, thus forming a cutout portion.

The polymer member 242 is formed to surround the elastic member 241, and is formed of an elastic and flexible film. The polymer member 242 is formed of elastic polymer, and may be formed of a material that does not react with an electrolyte solution, such as, for example, polyethylene, polypropylene, EPDM, and the like.

A support member 243 is formed in the shape of a band partially surrounding the polymer member 242, and a plurality of support members 243 are separated from each other on the periphery of the polymer member 242. In addition, the support members 243 may be formed as a film of polystyrene, which may be easily dissolved in the electrolyte solution.

As shown in FIG. 15, the core 240 is initially inserted in the electrode assembly 110 while the elastic member 241 is surrounded by, and pressed by, the support member 243 via the polymer member 232, such that the elastic member 241 is in a compressed state.

As shown in FIG. 16, the core 240 is inserted into the rechargeable battery, and thus contacts the electrolyte solution, enabling the support member 243 to be dissolved by the electrolyte solution, and causing a pressure applied to the elastic member 241 to be eliminated, thereby deforming the elastic member 241 and increasing a gap between the first side end 241 and the second side end 241. In addition, the polymer member 232 is extended, and thus supports the elastic member 241.

Accordingly, the elastic member 241 expands, or spreads, to have a smaller curvature than when initially inserted, and thus presses the electrode assembly 110 (e.g., toward an inner surface of the case 120). The polymer member can press the electrode assembly 110 by transmitting elastic force to the electrode assembly 110, which in turn supports the elastic member 241.

While embodiments of the present invention have been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and their equivalents.

| Description of Some of the Reference Characters | |
|---|---|
| 100: rechargeable battery | 110: electrode assembly |
| 112: positive electrode | 113: negative electrode |
| 114: separator | 120: case |
| 140: cap assembly | 143: cap plate |
| 146: middle plate | 147: sub-plate |
| 151: lead portion | 152: gasket |
| 160, 210, 220, 230, 240: core | |
| 161, 211, 221, 231, 241: elastic member | |
| 162, 212, 222, 232, 242: polymer member | |
| 223: notch | 233: dissolving unit |
| 243: support member | |

What is claimed is:

1. A battery comprising:
   an electrode assembly comprising a positive electrode, a negative electrode, and a separator between the positive electrode and the negative electrode;
   an elastic member at an interior of the electrode assembly and being configured to exert an elastic force on the electrode assembly;
   a torn polymer member between the elastic member and the electrode assembly; and
   a case for housing the electrode assembly, the elastic member, and the polymer member.

2. The battery of claim 1, wherein the polymer member comprises an adhesive interior surface or an adhesive exterior surface.

3. The battery of claim 1, wherein a length of the elastic member is substantially equal to a length of the electrode assembly.

4. The battery of claim 1, wherein the polymer member comprises polysterene, oriented polysterene, or a material that is at least partially dissolvable by electrolyte solution of the electrode assembly.

5. The battery of claim 1, wherein the polymer member comprises polyethylene, polypropylene, ethylene propylene diene monomer (EPDM), or a material that is non-reactive with electrolyte solution.

6. The battery of claim 5, wherein the polymer member is discontinuous along a periphery of the polymer member.

7. The battery of claim 1, further comprising an expandable support member partially surrounding the polymer member.

8. The battery of claim 7, wherein the support member comprises an elastic band.

9. A battery core comprising:
   an elastic member; and
   a torn polymer member at least partially surrounding the elastic member and compressing the elastic member,
   wherein the polymer member is configured to at least partially dissolve in an electrolyte solution to release compression of the elastic member.

10. The battery core of claim 9, wherein the polymer member comprises polysterene or oriented polysterene.

11. The battery core of claim 9, wherein the polymer member has a notch along a lateral side of the polymer member.

12. The battery core of claim 9, wherein the polymer member comprises:
   a material configured to dissolve in the electrolyte solution along a lateral side of the polymer member; and
   at least one of polyethylene, polypropylene, ethylene propylene diene monomer (EPDM), or a material that is non-reactive with the electrolyte solution.

13. The battery core of claim 9, further comprising an expandable support member partially surrounding the polymer member.

14. The battery core of claim 13, wherein the support member comprises an elastic band.

15. The battery core of claim 9, wherein the polymer member comprises an injection-molded pipe.

* * * * *